(12) United States Patent
Chiu

(10) Patent No.: US 7,190,136 B2
(45) Date of Patent: Mar. 13, 2007

(54) VARIABLE SPEED BRUSHLESS DC MOTOR

(75) Inventor: Hsien-Lin Chiu, Taipei (TW)

(73) Assignee: Hsien-Lin Chiu, Taipei Hsien (TW)

( * ) Notice: Subject to any disclaimer, the term of this patent is extended or adjusted under 35 U.S.C. 154(b) by 0 days.

(21) Appl. No.: 10/709,399

(22) Filed: May 2, 2004

(65) Prior Publication Data
US 2005/0088127 A1 Apr. 28, 2005

(51) Int. Cl.
H01R 39/46 (2006.01)
(52) U.S. Cl. .............. 318/439; 318/254; 318/138
(58) Field of Classification Search ......... 318/439, 318/254, 138, 771, 751, 752, 753, 754, 774, 318/797
See application file for complete search history.

(56) References Cited

U.S. PATENT DOCUMENTS 6,566,841 B2 * 5/2003 Bush et al. ............ 318/771
2003/0133317 A1 * 7/2003 Norrga ................. 363/127

* cited by examiner

Primary Examiner—Karen Masih

(57) ABSTRACT

A variable speed brushless DC motor includes a rotor, a stator module, and a commutation circuit having commutation switches and a speed-change switch. By means of on/off status of the speed-change switch to control the way of electric current passing through the stator module, the torque-rotational speed characteristic curve of the variable speed brushless DC motor is changed, and therefore the rotational speed of the motor is relatively changed.

8 Claims, 7 Drawing Sheets

VARIABLE SPEED BRUSHLESS DC MOTOR

CROSS REFERENCE TO RELATED APPLICATIONS

This application claims the priority benefit of Taiwan patent application number of 092210762 filed on Jun. 12, 2003.

BACKGROUND OF INVENTION

1. Field of the Invention

The present invention relates to a brushless DC motor and more particularly, to a variable speed brushless DC motor, which utilizes on/off status of a speed-change switch to control the way of electric current passing through the stator module, so as to further change the torque-rotational speed characteristic curve of the variable speed brushless DC motor, achieving the desired motor rotational speed control.

2. Description of the Related Art

The history of AC motor is over one hundred years, however, the history of brushless DC motor has only several decades. Since mid 1980s, brushless DC motor has been intensively used in instruments. Because brushless DC motor can be made to fit the specifications of different information products, market growth of brushless DC motor keeps going with fast development of information industry. Brushless DC motor still has a great market potential in the near future because of the following two reasons.

(a) World-wide PC market keeps developing, and a new generation of computer with fast CPU (Pentium or Pentium PRO) requires DC fan to dissipate heat.

(b) Many apparatus (car AV equipment, VGA card, etc.) start to use DC fan for cooling, thereby increasing the demand for brushless DC motor.

FIGS. 9 and 10 show a conventional commutation circuit for variable speed single-phase brushless DC motor. This design of commutation circuit is comprised of a power circuit A and a signal circuit B. During voltage supplying of the stator winding power source A1 and on status of the speed-change switch A2, the signal circuit B detects the magnetic pole of the rotor and switches the status of the commutation switches A3, A4, A5, A6, enabling electric current to pass through the stator winding A7, thereby rotating the motor. Further, when the speed-change switch A2 is off, electric current passes from the stator winding power source A1 through the voltage drop power resistor A8 where the voltage is dropped, and then passes to the stator winding A7, thereby lowering the rotational speed of the motor.

This structure of variable speed single-phase brushless DC motor has drawbacks as outlined hereinafter.

1. The use of a voltage drop power resistor A8 in the power circuit A greatly complicates the circuit and increases its size and manufacturing cost.

2. Because the operation of the voltage drop power resistor A8 in the power circuit A releases heat energy, a cooling fan using such a variable speed single-phase brushless DC motor has a low performance.

SUMMARY OF INVENTION

The present invention has been accomplished under the circumstances in view. It is therefore the main object of the present invention to provide a variable speed brushless DC motor, which uses a stator module to replace voltage drop power resistor, thereby lowering the manufacturing cost and minimizing the motor size. It is another object of the present invention to provide a variable speed brushless DC motor, which keeps the amount of electric current passing through the speed-change switch to be about one half of the total electric current of the stator module, so that the capacity of the speed-change switch can be greatly reduced to lower the manufacturing cost. To achieve these and other objects of the present invention, the variable speed brushless DC motor comprises a rotor, a commutation circuit, and a stator module. The commutation circuit comprises a power circuit and a signal circuit. The power circuit comprises a stator winding power source, four commutation switches, and a speed-change switch. The signal circuit comprises a rotor position sensor circuit and a commutation logic circuit. The commutation switches are arranged into two commutation switch sets connected in parallel to the stator winding power source. The speed-change switch is installed in one commutation switch set. The stator module is connected between the two commutation switch sets. The commutation logic circuit is adapted to connect and control on/off status of the four commutation switches of the power circuit. The stator module comprises at least two stator windings. On/off status of the speed-change switch controls supply of electric current to the stator module to further selectively energize the at least two stator windings.

DETAILED DESCRIPTION

Figure 1:
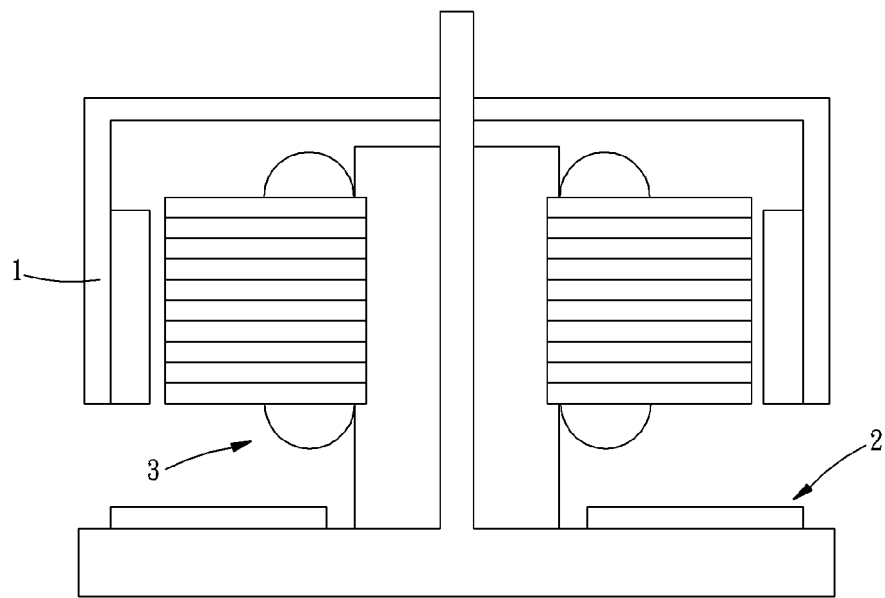
FIG. 1 is a schematic structural view of a variable speed brushless DC motor according to the present invention.
Figure 2:
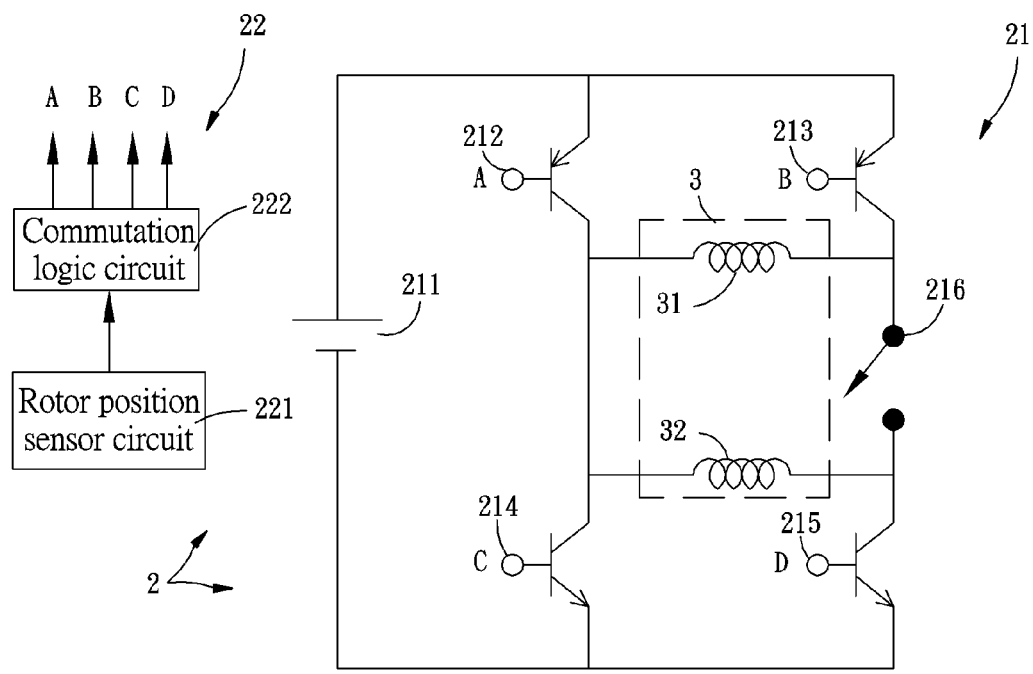
FIG. 2 is a circuit diagram of the variable speed brushless DC motor according to the present invention.

Referring to FIGS. 1 and 2, a variable speed brushless DC motor in accordance with the present invention is shown comprised of a rotor 1, a commutation circuit 2, and a stator module 3. The commutation circuit 2 comprises a power circuit 21 and a signal circuit 22. The power circuit 21 comprises a stator winding power source 211, a first commutation switch 212, a second commutation switch 213, a third commutation switch 214, and a fourth commutation switch 215, and a speed-change switch 216. The signal circuit 22 comprises a rotor position sensor circuit 221 and a commutation logic circuit 222. Further, the stator module 3 comprises a first stator winding 31 and a second stator winding 32. And the two stators windings 31 and 32 are the same phase.

Figure 3:
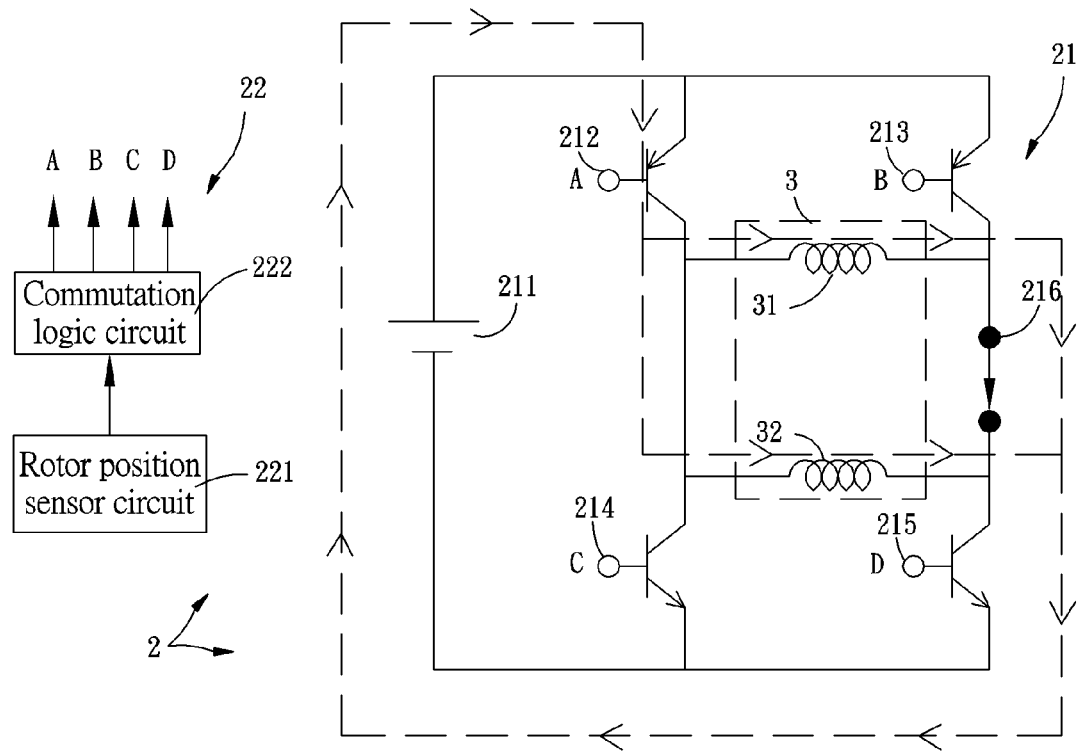
FIG. 3 is a circuit diagram of a part of the present invention showing an operation status of the commutation circuit (I).
Figure 4:
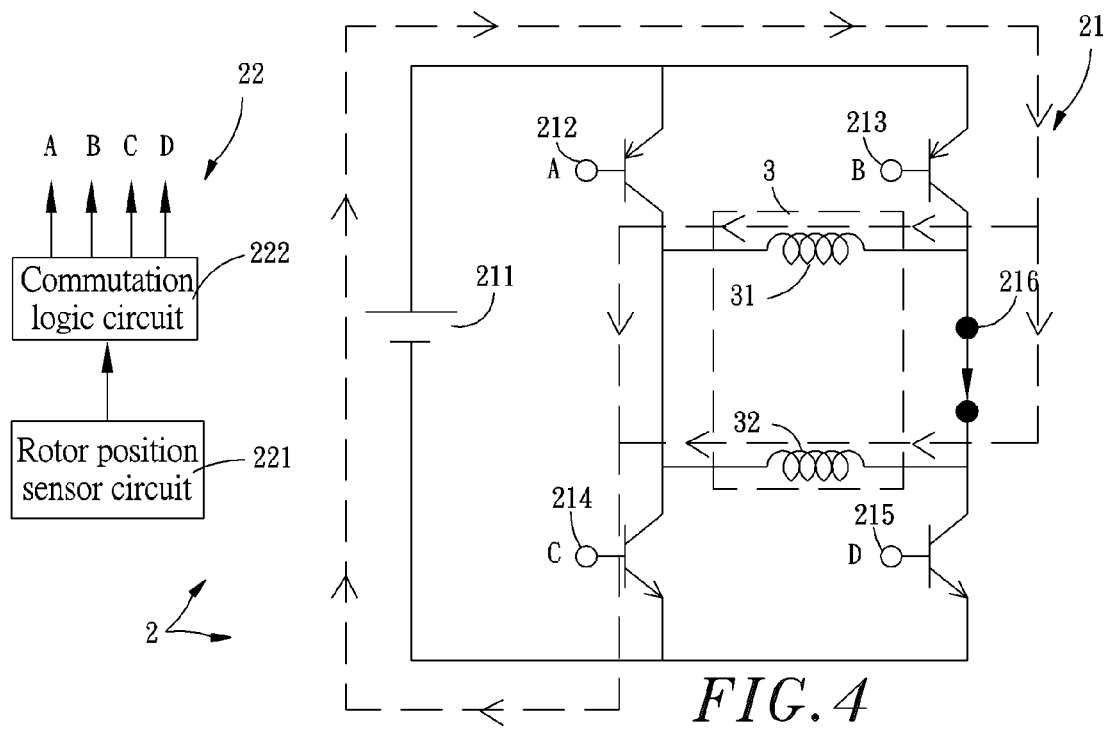
FIG. 4 is a circuit diagram of a part of the present invention showing an operation status of the commutation circuit (II).
Figure 7:
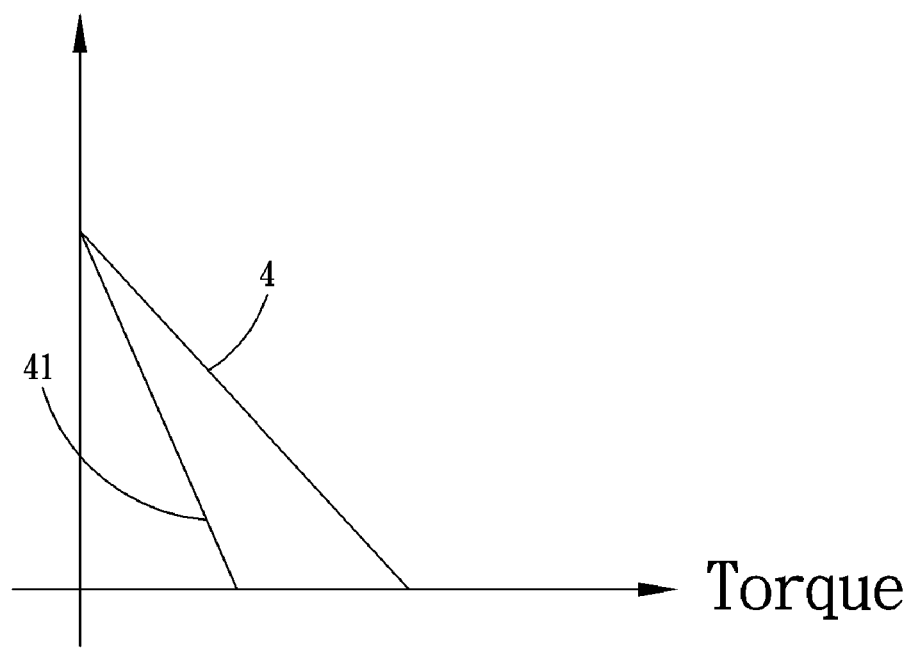
FIG. 7 is a characteristic curve chart of the present invention.

Referring to FIGS. 3 and 4, when the speed-change switch 216 of the power circuit 21 is on and the stator winding power source 211 is outputting a voltage, the rotor position sensor circuit 221 of the signal circuit 22 detects one magnetic pole of the rotor 1 (see also FIG. 1) and drives the commutation logic circuit 222 to switch on the first commutation switch 212 and the fourth commutation switch 215 and simultaneously to switch off the second commutation switch 213 and the third commutation switch 214. At this time, electric current passes through the first commutation switch 212 to the first stator winding 31 and second stator winding 32 of the stator module 3 to cause a magnetization, and then passes from the stator module 3 to the fourth commutation switch 215, thereby forming a loop (see FIG. 3). When the rotor position sensor circuit 221 detected another magnetic pole of the rotor 1, the rotor sensor position circuit 221 drives the commutation logic circuit 222 to switch on the second commutation switch 213 and the third commutation switch 214 and simultaneously to switch off the first commutation switch 212 and the fourth commutation switch 215. At this time, electric current passes through the second commutation switch 213 to the first stator winding 31 and second stator winding 32 of the stator module 3 to cause a magnetization, and then passes from the stator module 3 to the third commutation switch 214, thereby forming a loop (see FIG. 4). The aforesaid procedure is repeated again and again, keeping the motor to run. A characteristic curve 4 (see FIG. 7) is produced subject to the following DC brushless motors torque-rotational speed equation.

$$N=V/Ke-Ra/(Ke)^2 T.$$

Wherein, N=rotational speed of motor, T=torque of motor, Ke=constant of back EMF (electromotive force), Ra=resistance of stator winding, V=stator winding voltage.

Figure 5:
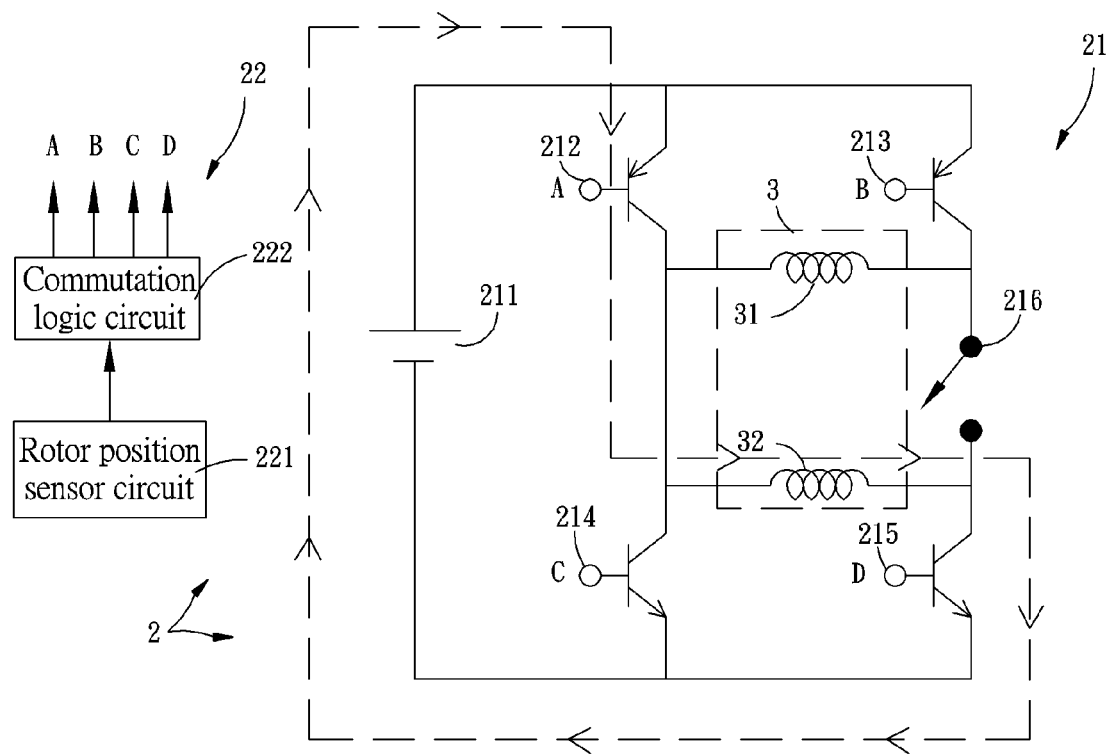
FIG. 5 is a circuit diagram of a part of the present invention showing an operation status of the commutation circuit (III).
Figure 6:
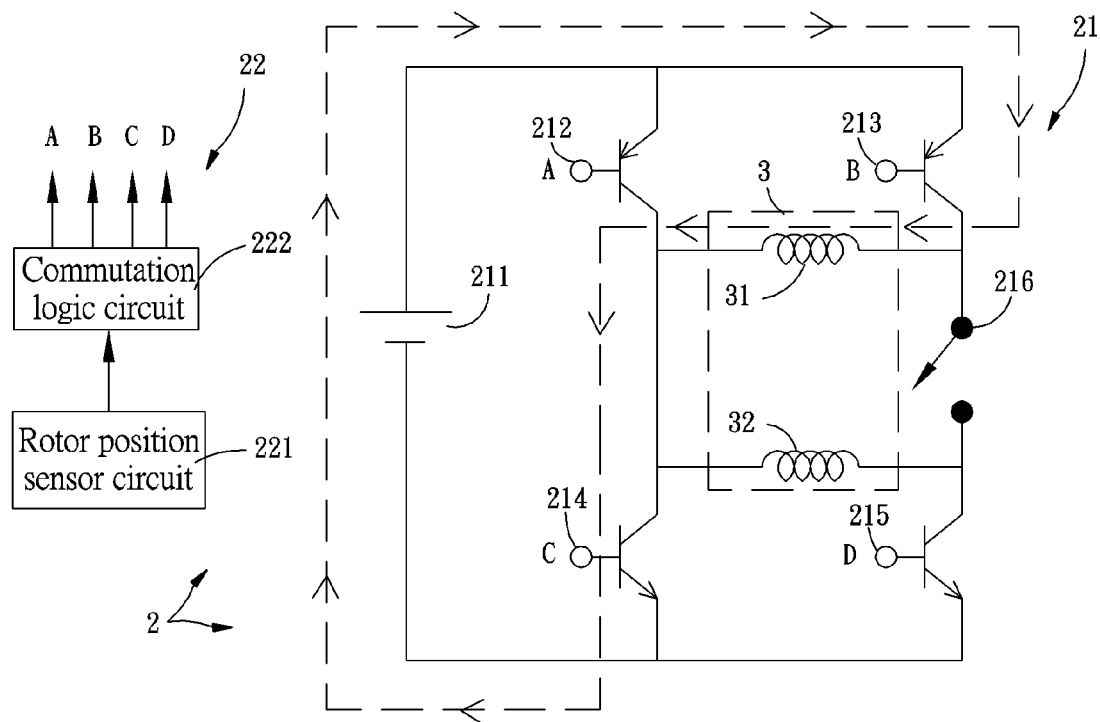
FIG. 6 is a circuit diagram of a part of the present invention showing an operation status of the commutation circuit (IV).

Referring to FIGS. 5 and 6, when the speed-change switch 216 of the power circuit 21 is off and the stator winding power source 211 is outputting a voltage, the rotor position sensor circuit 221 of the signal circuit 22 detects a magnetic pole of the rotor 1 (see FIG. 1) and drives the commutation logic circuit 222 to switch on the first commutation switch 212 and the fourth commutation switch 215 and simultaneously to switch off the second commutation switch 213 and the third commutation switch 214. At this time, electric current passes through the first commutation switch 212 to the second stator winding 32 of the stator module 3 to cause a magnetization, and then passes from the stator module 3 to the fourth commutation switch 215, thereby forming a loop (see FIG. 5). When the rotor position sensor circuit 221 of the signal circuit 22 detects another magnetic pole of the rotor 1, it drives the commutation logic circuit 222 to switch on the second commutation switch 213 and the third commutation switch 214 and simultaneously to switch off the first commutation switch 212 and the fourth commutation switch 215. At this time, electric current passes through the second commutation switch 213 to the first stator winding 31 of the stator module 3 to cause a magnetization, and then passes from the stator module 3 to the third commutation switch 214, thereby forming a loop (see FIG. 6). The constant of back EMF (electromotive force) remains unchanged when only one winding is in action, however the resistance of the stator module is doubled at this time, thereby producing a characteristic curve 41.

Figure 8:
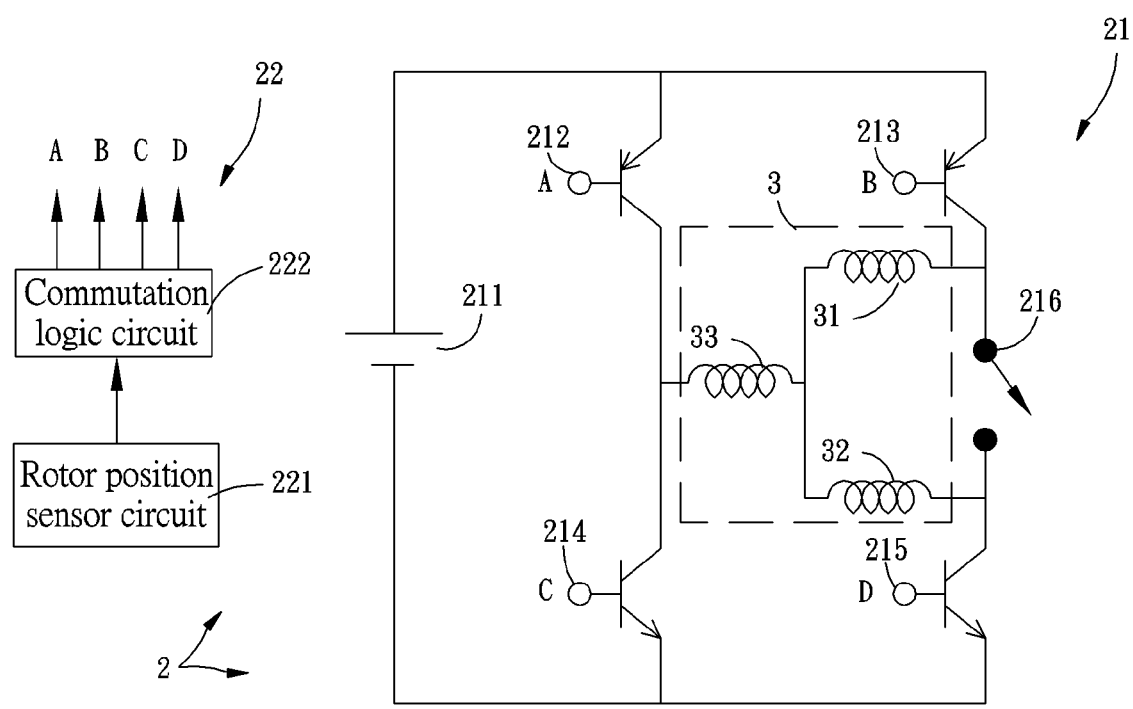
FIG. 8 is a circuit diagram of an alternate form of the variable speed brushless DC motor according to the present invention.
Figure 9:
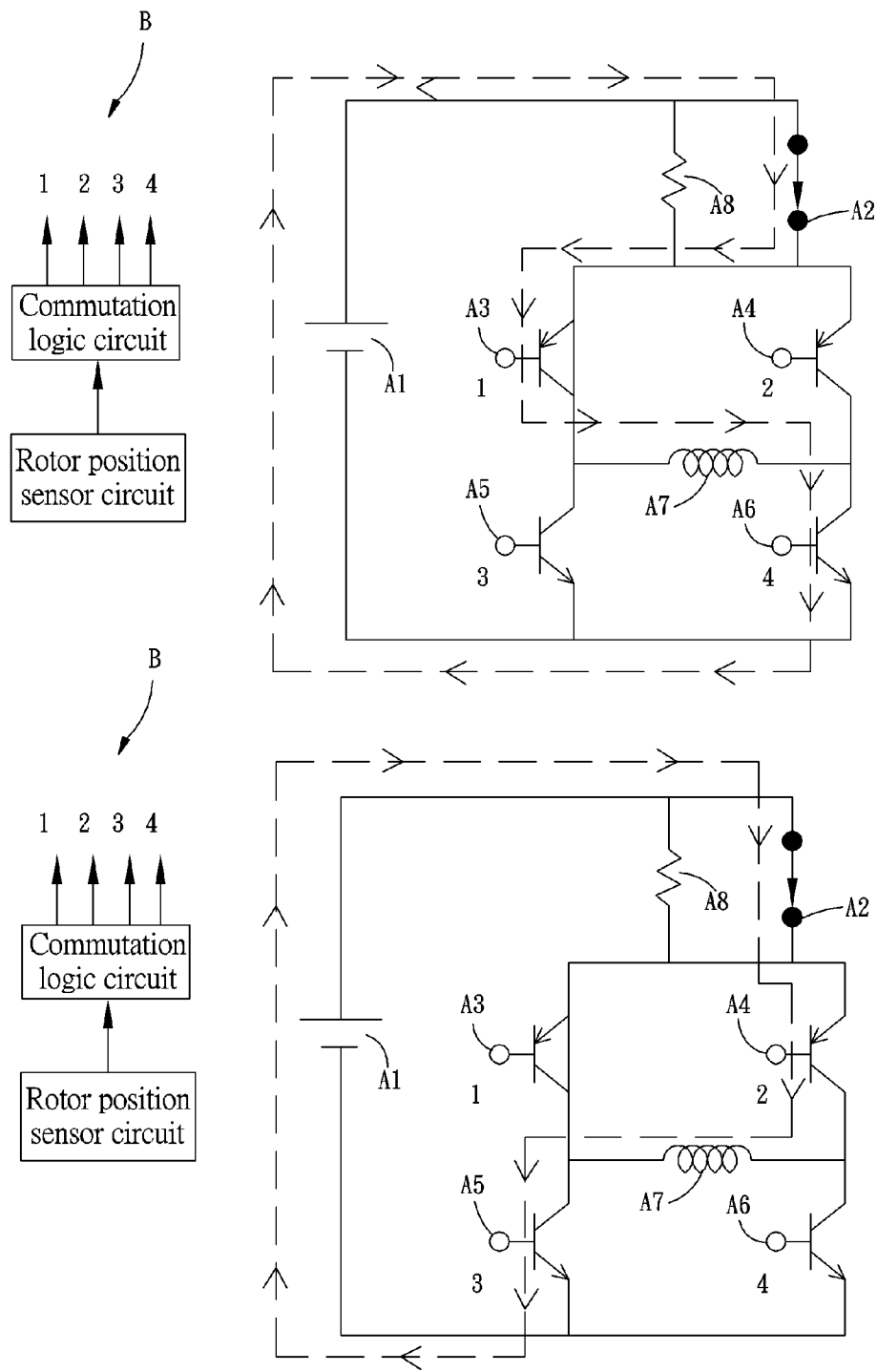
FIG. 9 is a circuit diagram of a variable speed single-phase brushless DC motor according to the prior art (I).
Figure 10:
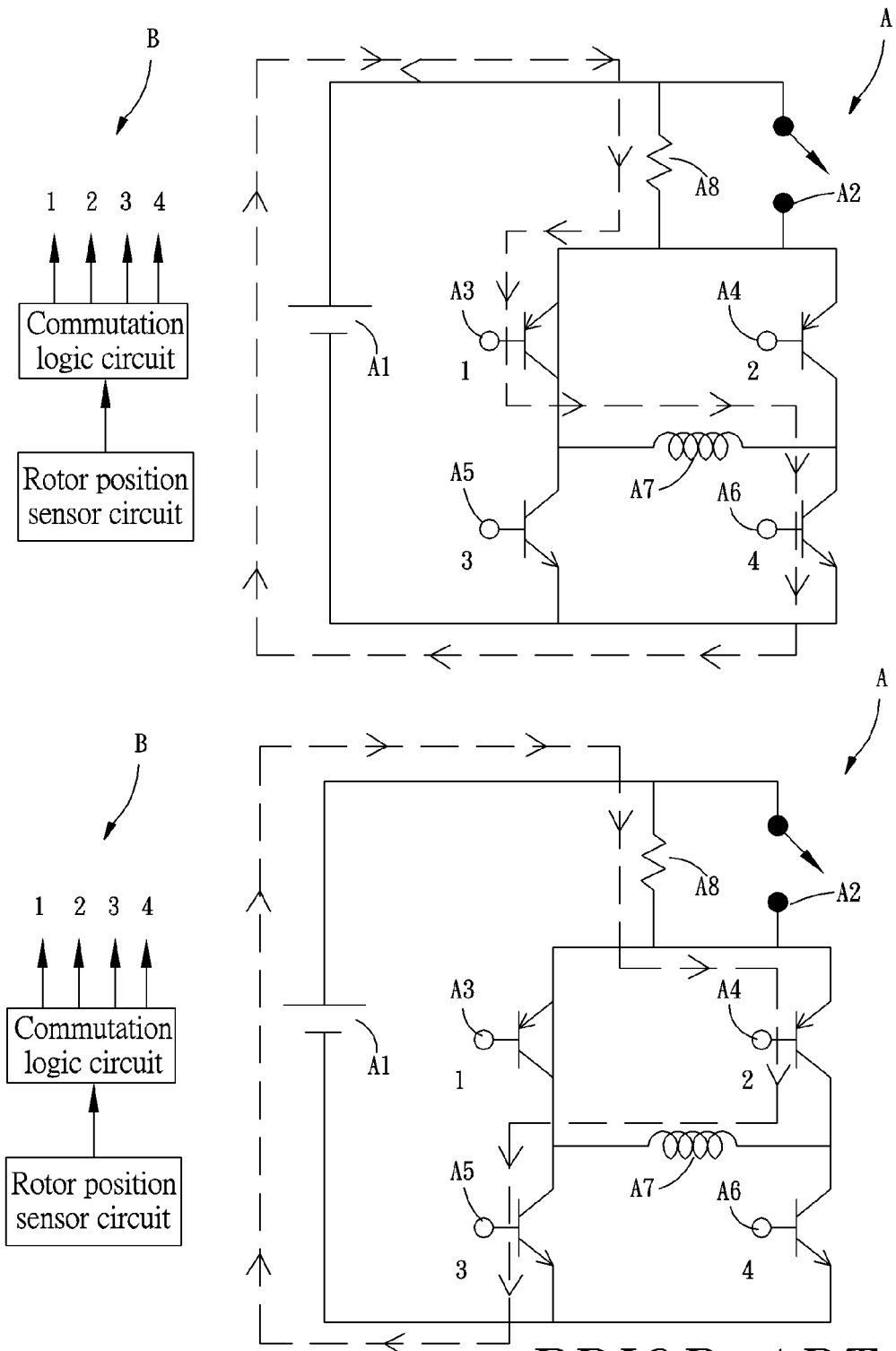
FIG. 10 is a circuit diagram of a variable speed single-phase brushless DC motor according to the prior art (II).

FIG. 8 shows an alternate form of the variable speed brushless DC motor according to the present invention. According to this embodiment, the stator module 3 further comprises a third stator winding 33, which changes the resistance value of the stator module 3 when switching on/off the speed-change switch 216, thereby producing a different characteristic curve.

As indicated above, by means of on/off action of the speed-change switch 216 and the way of the passing of electric current through stator windings, the characteristic curve of the variable speed brushless DC motor is changed, and therefore the rotational speed of the variable speed brushless DC motor is relatively changed. Further, during on status of the speed-change switch 216, electric current is directed to one direction, and therefore a one-way electronic switch (for example, transistor switch) or mechanical switch can be used for the speed-change switch 216. Because the amount of electric current passing through the speed-change switch 216 is about one half of the stator module 3, the mount of electric current of the switches can be greatly lowered to further lower the manufacturing cost.

A prototype of variable speed brushless DC motor has been constructed with the features of FIGS. 1~8. The variable speed brushless DC motor functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. A variable speed brushless DC motor comprising a rotor, a commutation circuit, and a stator module, said commutation circuit comprising a power circuit and a signal circuit, said power circuit comprising a stator winding power source, four commutation switches, and at least a speed-change switch, said signal circuit comprising a rotor position sensor circuit and a commutation logic circuit, said commutation switches being arranged into two commutation switch sets connected in parallel to said stator winding power source, said speed-change switch being installed in one said commutation switch set, said stator module being connected between said two commutation switch sets, said commutation logic circuit being adapted to connect and control on/off status of the four commutation switches of said power circuit, wherein said stator module comprises at least-two stator windings; on/off status of said speed-change switch controls supply of electric current to said suitor module to further selectively energize said at least two stator windings, wherein during the on status of said speed-change switch, electric current flows through said at least two stator windings and during the off status of said speed-change switch, electric current alternately flows through one of said at least two stator windings which connected to the speed-change switch, and wherein said speed-change switch comprises a unidirectional current switch.

2. The variable speed brushless DC motor as claimed in claim 1, wherein said at least two stator windings are divided into two vertically spaced symmetric circuits when extended out horizontally by means of equivalent circuit, said two vertically spaced symmetric circuits being in balance and having the same phase.

3. The variable speed brushless DC motor as claimed in claim 1, wherein said speed-change switch is a bipolar junction transistor switch.

4. The variable speed brushless DC motor as claimed in claim 1, wherein said speed-change switch is a field effect transistor switch.

5. The variable speed brushless DC motor as claimed in claim 1, wherein said rotor position sensor circuit is a photo encoder circuit.

6. The variable speed brushless DC motor as claimed in claim 1, wherein said rotor position sensor circuit is a Hall element circuit.

7. The variable speed brushless DC motor as claimed in claim 1, wherein said commutation switch is a bipolar junction transistor switch.

8. The variable speed brushless DC motor as claimed in claim 1, wherein said commutation switch is a field effect transistor switch.

* * * * *